UNITED STATES PATENT OFFICE.

HERMAN HEUSER, OF CHICAGO, ILLINOIS.

MANUFACTURE OF EXTRACTS OF BEER AND OTHER FERMENTED BEVERAGES.

1,290,191.     Specification of Letters Patent.     Patented Jan. 7, 1919.

No Drawing.     Application filed December 11, 1916. Serial No. 136,171.

*To all whom it may concern:*

Be it known that I, HERMAN HEUSER, a citizen of the United States, residing at Chicago, in the county of Cook and State of Illinois, have invented certain new and useful Improvements in the Manufacture of Extracts of Beer and other Fermented Beverages, of which the following is a specification.

My invention relates to the manufacture of yeast-treated syrups or extracts of beer or other fermented beverages, and its object is to provide such an extract or condensed liquid which is yeast-treated or subjected to the effects of yeast-fermentation so that when diluted or thinned down with water it furnishes an alcohol-reduced beverage having the characteristic taste and flavor imparted by yeast-fermentation, as for example the taste and flavor of beer beverages such as beer, weissbeer, porter, stout and ale.

Extracts of beer or other fermented beverages, in the form of condensed or concentrated liquids, made by various processes, are now well known, and these liquids are converted into beverages resembling somewhat their originals by mixing any desired proportion of water or aerated water with a due proportion of the extract. For example, the patent to Lockwood numbered 169,818, dated November 9, 1875, describes such extracts and a method of making them. But in all these prior instances, the extract or concentrated liquid is not subjected to the action or effect of yeast-fermentation and so is not naturally alcoholic, does not possess the carbonating property or effect, and does not have the taste and flavor due to yeast-fermentation; and consequently the diluted beverage or mixture formed by adding water to the extract does not possess the characteristics imparted by yeast-fermentation, and in order to provide these characteristics it is necessary for the dealer or consumer to add yeast to the diluted beverage and then to ferment the dilution, which requires knowledge and skill not ordinarily possessed by consumers or dealers.

By my invention I obviate these objections and provide an yeast-treated or fermented syrup or extract of a fermented beverage extract to which the user or retailer merely adds water to provide a beverage having the characteristics imparted by yeast-fermentation.

In the practice of my invention I prefer to use as a base an extract derived from fermenting a grain mixture or mash and condensed or concentrated by boiling, preferably *in vacuo;* for example, a beer extract thus produced. The base extract or syrup is cooled to yeast-fermentation temperature, and then is mixed or pitched with yeast in active condition together with a liquid containing the elements for fermentation, such as a 14° balling wort, and preferably while stirring takes place to expedite fermentation. The amount of elements of fermentation depends on the alcoholic strength desired in the extract used for the remade beverage; for example, if the alcohol content is to be one per cent., the amount of fermentable carbonhydrates added to the base extract or syrup should be two per cent. The yeast is preferably in large quantity, for example about twice as much in respect to the amount of fermentable carbohydrates in said added liquid as is usually employed to pitch ordinary fermented beverages, and it may be added to the condensed liquid or extract with a suitable quantity of a liquid containing the elements required for yeast-fermentation; for example, for beer it is contained in a suitable quantity of wort, and if the wort is in the form of a 14° balling wort, a ten per cent. addition of such wort to a fifty per cent. condensed beer extract is adequate, and the amount of yeast contained in such kraeusen would be two pounds per barrel. The syrup or extract is left exposed to the action of the yeast, preferably in a closed and pressure-proof container, until it has acquired the desired characteristics imparted by the action of and contact with the yeast, which may be ascertained by sampling, and then preferably it is clarified to obtain clearness or brilliancy, when it is ready for the market.

The yeast-treatment of the base extract or condensed liquid is preferably in a closed and pressure-proof container, because it excludes infection from the surrounding atmosphere, and it also increases the amount of $CO_2$ generated in the extract or syrup. In proportion as the $CO_2$ collects in the extract the keeping quality of the extract itself increases, and the $CO_2$ also provides effervescence in the beverage formed by diluting the extract with plain water and so makes the extract ready for use where carbonated or charged water is not available, this effervescence being in proportion to the degree of carbonation of the extract and the degree of dilution. It is desirable to accumulate enough $CO_2$ in the syrup or extract for these purposes. The amount of alcohol produced in this yeast-treated extract is in proportion to the amount of fermentable carbohydrates contained in the extract used for furnishing the elements of fermentation.

The resulting yeast-treated extract or condensed liquid possesses and imparts the characteristic flavor and taste that can be produced and imparted only by yeast-fermentation, it is naturally alcoholic, and it also is impregnated with and contains $CO_2$. The alcohol-reduced beverage made by diluting this yeast-treated condensed liquid resembles very closely in flavor and taste the original beverage from which the base extract or syrup is made; for example, beer made by diluting this yeast-treated beer-extract closely resembles the original beer in taste and flavor, and excels in these respects beers made by diluting beer extracts that have not been yeast-treated. Neither the dealer nor the user is required to pitch and ferment the diluted beverage, as the yeast-treated or fermented syrup or extract obviates these steps, while the impregnation of the extract with $CO_2$ increases its keeping quality and also imparts more or less effervescence to the diluted beverage, and the alcohol content makes it directly applicable for the production of alcohol-reduced beverages.

It is the action of the yeast upon the fermentable matter added to the base extract or originally present therein that produces in the finished extract the characteristics referred to; where these elements of fermentation are present in the base extract the yeast may be added as mere yeast, and where they are not so present they are added with the yeast.

I claim:—

1. As a new article of manufacture a liquid fermented condensed extract of a fermented-beverage subjected to the effect of yeast-fermentation after the condensation of said extract.

2. As a new article of manufacture a condensed fermented liquid beer-extract treated by yeast-fermentation after the condensation of said extract.

3. The step in the process of making condensed extracts of beverages which consists in imparting the characteristic taste and flavor of yeast-fermentation to a liquid condensed fermentable extract of a fermented beverage after the condensation of said extract.

4. The step in the process of making condensed extracts of beverages which consists in subjecting a condensed fermentable extract of a fermented beverage to the effect of yeast-fermentation after the condensation of said extract.

5. The step in the process of making condensed beer extracts which consists in subjecting a condensed fermentable extract of beer to the effect of yeast-fermentation in a closed container after the condensation of said extract.

6. The step in the process of making condensed extracts of beverages which consists in mixing a condensed fermentable extract of a fermented beverage with yeast and a liquid containing the elements of fermentation after the condensation of said extract.

In testimony whereof I affix my signature in presence of two witnesses.

HERMAN HEUSER.

Witnesses:
J. McRoberts,
Edith H. Wilcox.